United States Patent
Fukuchi (10) Patent No.: US 9,864,826 B2
(45) Date of Patent: Jan. 9, 2018

(54) MULTILAYER PRINTED BOARD AND LAYOUT METHOD FOR MULTILAYER PRINTED BOARD

(71) Applicant: Toshiba Memory Corporation, Minato-ku (JP)

(72) Inventor: Satoru Fukuchi, Chigasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 77 days.

(21) Appl. No.: 14/644,622

(22) Filed: Mar. 11, 2015

(65) Prior Publication Data

US 2016/0128191 A1    May 5, 2016

Related U.S. Application Data (60) Provisional application No. 62/074,346, filed on Nov. 3, 2014.

(51) Int. Cl.

| | | |
|---|---|---|
| *G06F 17/50* | (2006.01) | |
| *H05K 1/11* | (2006.01) | |
| *H05K 1/02* | (2006.01) | |
| *H05K 3/00* | (2006.01) | |

(52) U.S. Cl.
CPC ...... *G06F 17/5068* (2013.01); *G06F 17/5031* (2013.01); *G06F 17/5077* (2013.01); *H05K 1/0245* (2013.01); *H05K 1/116* (2013.01); *H05K 1/0251* (2013.01); *H05K 1/0298* (2013.01); *H05K 3/0005* (2013.01)

(58) Field of Classification Search
CPC ............... H05K 1/111; H05K 1/0298
USPC ........................................ 174/261
See application file for complete search history.

(56) References Cited

U.S. PATENT DOCUMENTS

| | | | | |
|---|---|---|---|---|
| 5,464,682 A | * | 11/1995 | Perfecto | H01L 23/5384 174/261 |
| 5,777,526 A | | 7/1998 | Kawasaki | |
| 6,072,126 A | * | 6/2000 | Shiga | H01H 13/702 174/250 |
| 9,192,044 B2 | * | 11/2015 | Hayashi | H05K 1/0216 |
| 2006/0022312 A1 | * | 2/2006 | Greeley | H01L 23/66 257/664 |
| 2006/0145927 A1 | * | 7/2006 | Choi | H01Q 1/22 343/700 MS |

(Continued)

FOREIGN PATENT DOCUMENTS

| | | |
|---|---|---|
| JP | 8-78940 | 3/1996 |
| JP | 11-135920 | 5/1999 |

(Continued)

*Primary Examiner* — Hoa C Nguyen
*Assistant Examiner* — Stanley Tso
(74) *Attorney, Agent, or Firm* — Oblon, McClelland, Maier & Neustadt, L.L.P.

(57) ABSTRACT

According to one embodiment, a multilayer printed board includes an insulating substrate, a differential signal wiring, and anti-pad regions. Distances between peripheries of the pad and a constant potential layer in each of the wiring layers are set so that a capacitance between the constant potential layers and a signal via included in a signal line constituting the differential signal wiring, which has a longer route from a transmission end to a reception end, is smaller than a capacitance between the constant potential layers and another signal via included in the other signal line.

16 Claims, 11 Drawing Sheets

(56) References Cited

U.S. PATENT DOCUMENTS

| | | |
|---|---|---|
| 2006/0151869 A1 | 7/2006 | Gisin et al. |
| 2006/0258187 A1* | 11/2006 | Behziz .................. H05K 1/116 439/77 |
| 2008/0048639 A1* | 2/2008 | Sutono ............... G01R 1/06772 324/76.19 |
| 2008/0048796 A1* | 2/2008 | Shaul ...................... H01P 3/003 333/4 |
| 2011/0203843 A1 | 8/2011 | Kushta |
| 2012/0061129 A1* | 3/2012 | Lai ......................... H05K 1/111 174/257 |
| 2012/0193128 A1* | 8/2012 | Olsen .................... H05K 1/025 174/251 |
| 2012/0206379 A1* | 8/2012 | Ho .......................... G06F 3/044 345/173 |
| 2012/0215515 A1* | 8/2012 | Norte ................... H05K 1/0251 703/14 |
| 2013/0093532 A1* | 4/2013 | Watanabe ............ H05K 1/0253 333/33 |
| 2013/0320568 A1* | 12/2013 | Aoki ....................... H01L 24/09 257/777 |
| 2014/0174808 A1* | 6/2014 | Zhang ................... H05K 1/113 174/261 |
| 2014/0238733 A1* | 8/2014 | Mutnury ................ H05K 1/115 174/266 |

FOREIGN PATENT DOCUMENTS

| | | |
|---|---|---|
| JP | 2004-31531 | 1/2004 |
| JP | 2005-277028 | 10/2005 |
| JP | 2006-270026 | 10/2006 |
| JP | 2008-527724 | 7/2008 |
| JP | 2008-244703 | 10/2008 |
| JP | 2010-506380 | 2/2010 |

* cited by examiner

MULTILAYER PRINTED BOARD AND LAYOUT METHOD FOR MULTILAYER PRINTED BOARD

CROSS-REFERENCE TO RELATED APPLICATIONS

This application is based upon and claims the benefit of priority from U.S. Provisional Application No. 62/074,346, filed on Nov. 3, 2014; the entire contents of which are incorporated herein by reference.

FIELD

Embodiments described herein relate generally to a multilayer printed board and a layout method for a multilayer printed board.

BACKGROUND

As a multilayer printed board, there is a type provided with a differential signal wiring. In the multilayer printed board, portions of a differential signal wiring formed on one side are connected to portions of the differential signal wiring formed on the other side through vias. The differential signal wiring needs to be configured such that signals are transmitted with the same phase and reverse polarities from a transmission end and are received with a phase shift within a predetermined range by a reception end. For this reason, there is conventionally proposed a technique of adjusting the electric lengths of a differential signal wiring on a printed board. For example, the shapes of vias are altered from a circular shape to an elliptical shape, and/or the land diameters of vias are made different, to adjust the electric lengths of the differential signal wiring.

However, according to the conventional method, the shapes of vias or lands are made different depending on the place, and so the shapes of vias or lands are varied depending on the differential signal wiring. Consequently, it takes labor hour to design the layout.

DETAILED DESCRIPTION

In general, according to one embodiment, a multilayer printed board includes an insulating substrate, a differential signal wiring, and anti-pad regions. The insulating substrate is made of an insulating material and provided with two or more wiring layers that include a constant potential layer and are disposed thereon in a thickness direction. The differential signal wiring is composed of two signal lines arranged in parallel with each other. Each of the two signal lines includes wiring portions arranged at the different wiring layers, a signal via, and pads. The wiring portion is arranged in a region where the constant potential layer is not arranged in each of the wiring layers. The signal via is connecting between the wiring portions of the different wiring layers. The pads are respectively arranged at connection positions between the wiring portions and the signal via, within the wiring layers. The anti-pad regions are respectively formed between the pads and the constant potential layer in each of the wiring layers. Distances between peripheries of the pad and the constant potential layer in each of the wiring layers are set so that a capacitance between the constant potential layers and a signal via included in one of the signal lines constituting the differential signal wiring, which has a longer route from a transmission end to a reception end, is smaller than a capacitance between the constant potential layers and another signal via included in the other one of the signal lines.

Exemplary embodiments of a multilayer printed board and a layout method for a multilayer printed board will be explained below in detail with reference to the accompanying drawings. The present invention is not limited to the following embodiments. The sectional views, top views, and bottom views of multilayer printed boards used in the following embodiments are schematic, and so the relationship between the thickness and width of each layer and/or the thickness ratios between respective layers may be different from actual states. Further, each of the multilayer printed boards shown in the following embodiments encompasses a printed wiring board or a multilayer board (interposer) inside an IC (Integrated Circuit) package.

(First Embodiment)

Figure 1A:
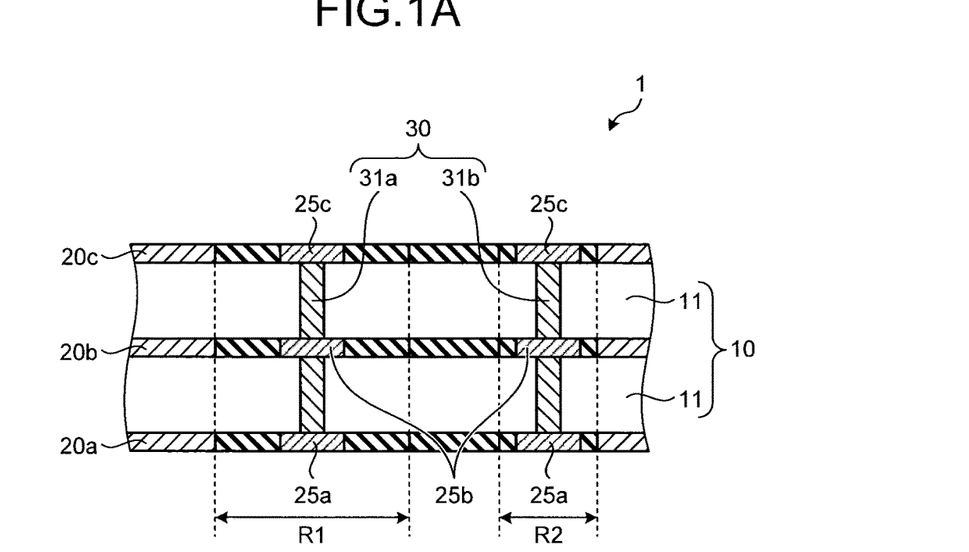
FIGS. 1A to 1C are views schematically showing part of the structure of a multilayer printed board according to a first embodiment.
Figure 1B:
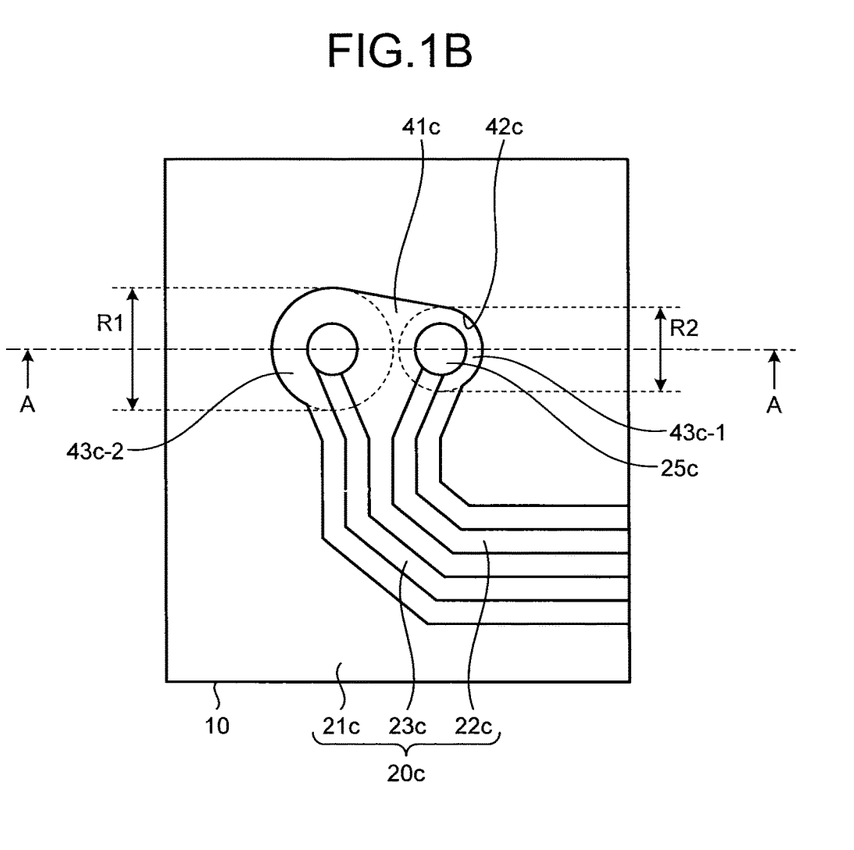
Figure 1C:
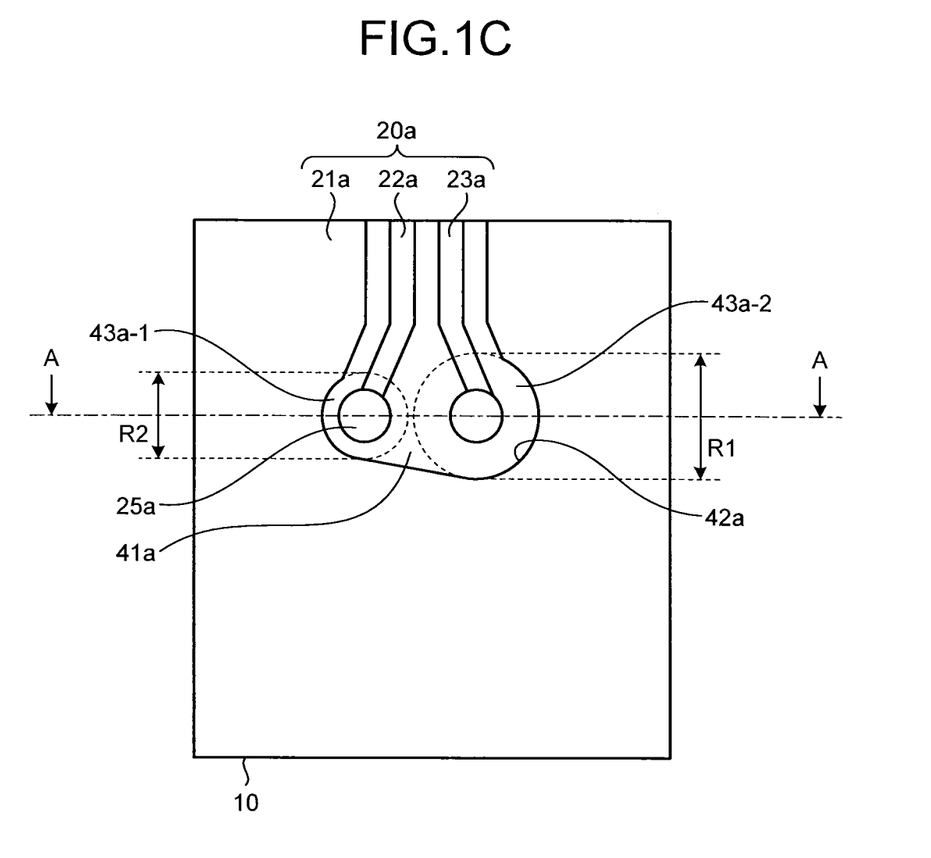

FIGS. 1A to 1C are views schematically showing part of the structure of a multilayer printed board according to a first embodiment. Here, FIG. 1A is a sectional view taken along a line A-A in FIGS. 1B and 1C, FIG. 1B is a top view of the multilayer printed board shown in FIG. 1A, and FIG. 1C is a bottom view of the multilayer printed board shown in FIG. 1A.

The multilayer printed board 1 is configured such that wiring lines are formed on an insulating substrate 10. The insulating substrate 10 is composed of a plurality of insulating layers 11 stacked each other. Wiring layers 20a to 20c are respectively formed on the upper and lower sides of the insulating substrate 10 and between the plurality of insulating layers 11. For example, the insulating layers 11 are made of a glass epoxy resin, fluorine contained resin, or polyimide resin. In the example shown in FIG. 1A, the insulating substrate 10 is formed of two insulating layers 11.

In the example shown in FIG. 1A, the multilayer printed board 1 includes a first wiring layer 20a, a second wiring layer 20b, and a third wiring layer 20c formed in this order from the bottom. In the following explanation, each of the wiring layers 20a to 20c will be simply referred to as the wiring layer 20 in a case where there is no need to distinguish them. The wiring layer 20 includes a constant potential layer and signal lines. The constant potential layer is a conductive layer supplied with a voltage so that it is set at a predetermined potential. For example, the constant potential layer is a power supply layer or GND layer. In the first embodiment, the signal lines form a differential signal wiring. The two signal lines are formed by patterning and separated with a predetermined space. Other than the positions at which the signal lines are formed, the constant potential layer is arranged such that it is separated from the signal lines by a predetermined distance. An insulator, such as a glass epoxy resin, fluorine contained resin, or polyimide resin, is arranged for insulation between the signal lines and between the constant potential layer and the signal lines. For example, the wiring layer 20 is made of copper foil.

For example, as shown in FIG. 1C, the first wiring layer 20a includes a constant potential layer 21a and two wiring portions (signal lines) 22a and 23a that constitute the differential signal wiring. Further, as shown in FIG. 1B, the third wiring layer 20c includes a constant potential layer 21c and two wiring portions (signal lines 22c and 23c) that constitute the differential signal wiring.

Further, the insulating substrate 10 includes vias 30 connecting constant potential layers or signal lines between different wiring layers 20. Each of the vias 30 extends in the thickness direction of the insulating substrate 10. In the first embodiment, each of the vias 30 has a complete round shape, and the diameters of the vias 30 are equal to each other. For example, the vias 30 are made of copper or aluminum. FIGS. 1A to 1C show a pair of signal vias 31a and 31b connected to the differential signal wiring. Each of the vias 30 is formed in a through-hole penetrating the insulating substrate 10 in the thickness direction.

Further, pads 25a to 25c are respectively provided at the connection positions between the signal lines and the vias 30 of the insulating substrate 10. In the first embodiment, each of the pads 25a to 25c also has a complete round shape, and the diameters of the pads 25a to 25c are equal to each other. The diameter of the pads 25a to 25c is larger than the diameter of the vias 30. For example, the pads 25a to 25c are made of copper.

Each of the pads 25a or 25c is disposed in an opening 41a or 41c at which the constant potential layer 21a or 21c is not present. The position where each of the pads 25a or 25c is arranged in the opening 41a or 41c will be referred to as a pad region. Each of the pads 25a or 25c is arranged to be separated from the constant potential layer 21a or 21c. In other words, the peripheral portion of the pad region is separated from the edge of each of the opening 41a or 41c (which will be referred to as an opening edge 42a or 42c, hereinafter) by a predetermined distance. The region outside the pad region and inside the opening edge 42a or 42c will be referred to as an anti-pad region 43a-1, 43a-2, 43c-1, or 43c-2. For example, the anti-pad regions 43a-1, 43a-2, 43c-1, and 43c-2 are formed with a glass epoxy resin, fluorine contained resin, or polyimide resin.

In the case of the differential signal wiring, a pair of signal lines 22 and 23 are arranged close to each other, and so the positions where the signal vias 31a and 31b are formed are also close to each other. Accordingly, other than a state where openings are formed independently of each other for the respective signal vias 31a and 31b, there is a case where openings for the two signal vias 31a and 31b are formed in a connected state as exemplified by the opening 41c or 41a shown in FIGS. 1B and 1C. In this case, the constant potential layer 21a or 21c is not necessarily present over the entire circumference of the pads 25a or 25c. In such a case, the relationship of a peripheral portion of each of the pads 25a or 25c, around which the constant potential layer 21a or 21c is present, relative to the constant potential layer 21a or 21c (opening edge 42a or 42c) is applied to a peripheral portion of each of the pads 25a or 25c, around which the constant potential layer 21a or 21c is not present, to form an imaginary opening edge. Then, within the region defined by the imaginary opening edge and the actual opening edge 42a or 42c, the region other than the pad region is considered as the anti-pad region 43a-1, 43a-2, 43c-1, or 43c-2.

If the opening edge 42a or 42c partly has a circular arc shape, the relationship of a peripheral portion of each of the pads 25a or 25c relative to the circular arc part of the opening edge 42a or 42c is applied to a portion of the pads 25a or 25c around which the constant potential layer 21a or 21c is not present. Consequently, the anti-pad region 43a-1, 43a-2, 43c-1, or 43c-2 having a doughnut-like shape (annular shape) is obtained. The radius of a circle having a circumference defined by the periphery of the anti-pad region 43a-1, 43a-2, 43c-1, or 43c-2 will be referred to as an anti-pad radius. In the first embodiment, of the signal lines 22 and 23 forming a differential signal wiring, an anti-pad radius of the via 31a included in the signal line 23 having a longer wiring line distance is set larger than the other.

Figure 2A:
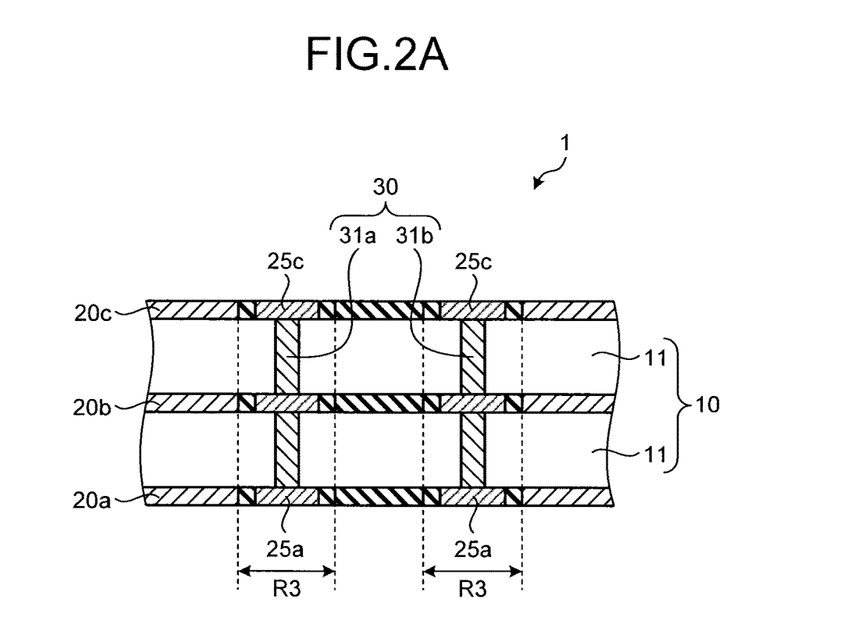
FIGS. 2A and 2B are views schematically showing part of the structure of a general multilayer printed board.
Figure 2B:
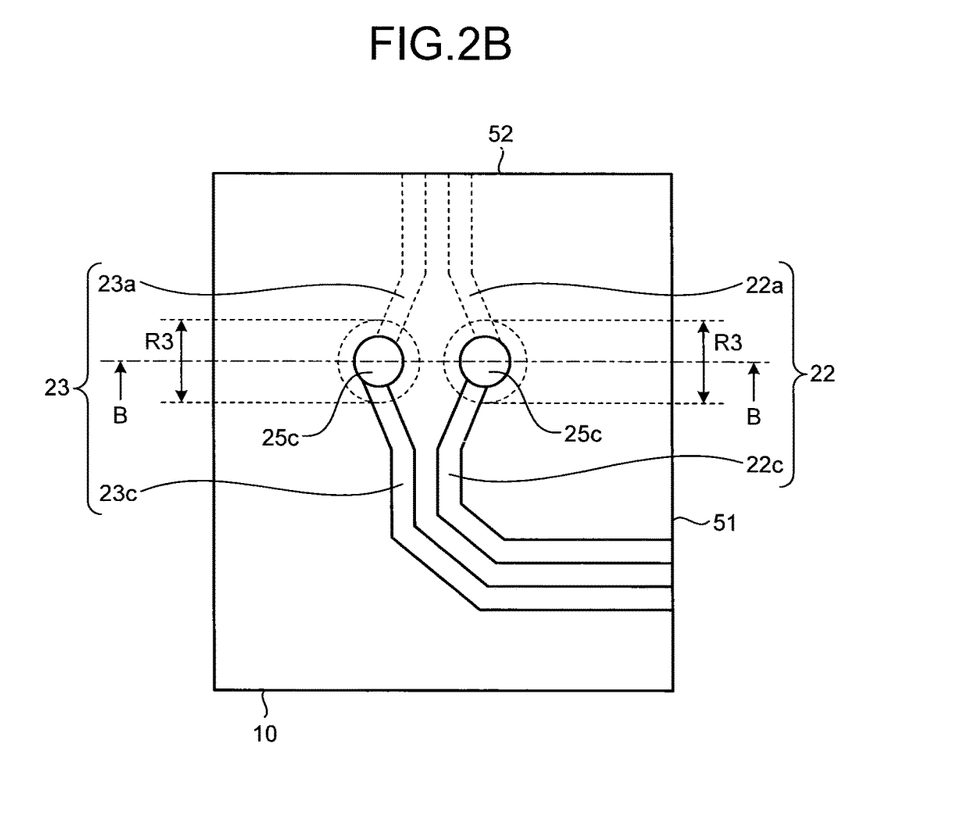

Next, an explanation will be given of a signal delay between the two signal lines 22 and 23 forming a differential signal wiring. FIGS. 2A and 2B are views schematically showing part of the structure of a general multilayer printed board. Here, FIG. 2A is a sectional view taken along a line B-B in FIG. 2B, and FIG. 2B is a view schematically showing the routes of the differential signal wiring on the multilayer printed board shown in FIG. 2A. In the general multilayer printed board 1, the anti-pad radii of two signal vias 31a and 31b have the same value R3. In the following explanation, the constituent elements corresponding to those shown in FIGS. 1A to 1C are denoted by the same reference numerals, and their description will be omitted. Further, in FIG. 2B, wiring portions 22a and 23a formed on the lower side of an insulating substrate 10 are shown with broken lines, and illustration of a constant potential layer 21 is omitted.

The differential signal wiring is formed of a set of two signal lines 22 and 23. The differential signal wiring needs to be configured such that, when signals are propagated, the signals are transmitted from a transmission end 51 at the same time and with reverse polarities and the same phase, and the signals are received by a reception end 52 at the same time and with the same phase and reverse polarities. The transmission end 51 is a connection point of the signal lines 22 and 23 to a device (such as a semiconductor chip) located at the transmission source of signals propagated through the signal lines 22 and 23. Further, the reception end 52 is a connection point of the signal lines 22 and 23 to a device (such as a semiconductor chip) located at the transmission destination of signals propagated through the signal lines 22 and 23.

As shown in FIGS. 2A and 2B, the signal line 22 is composed of a wiring portion 22c and a pad 25c on the upper side (third wiring layer 20c) of the insulating substrate 10, a signal via 31b, and a pad 25a and a wiring portion 22a on the lower side (first wiring layer 20a) of the insulating substrate 10. Further, the signal line 23 is composed of a wiring portion 23c and a pad 25c on the upper side of the insulating substrate 10, a signal via 31a, and a pad 25a and a wiring portion 23a on the lower side of the insulating substrate 10. As shown in FIG. 2B, as regards physical wiring line length, the signal line 23 is longer than the signal line 22. Accordingly, when differential signals are caused to flow, the signal arrives at the reception end 52 of the signal line 23 with a delay, as compared with the signal line 22. In light of this, conventionally, the shapes of the signal vias 31a and 31b are altered from a circular shape to an elliptical shape, and/or the diameters of the pads 25a and 25c of the signal vias 31a and 31b are made different, as described previously.

On the other hand, in the first embodiment, the anti-pad radius R1 of the signal via 31a included in the signal line 23 having a longer wiring line distance is set larger than the anti-pad radius R2 of the signal via 31b included in the other signal line 22. When the anti-pad radius is set larger, the capacitance between the signal via and the constant potential layers 21a to 21c around the signal via becomes smaller. It should be noted that this capacitance is defined by deducting the capacitance between the signal line and the constant potential layers around the signal line. Further, the signal propagation time is the square root of the product of the inductance and the capacitance. Accordingly, the smaller the capacitance between the signal via and the constant potential layers 21a to 21c is, the smaller (shorter) the propagation time becomes. Specifically, when the two signal vias 31a and 31b having different capacitances between them and the constant potential layers 21a to 21c are compared with each other, the signal propagation time is smaller in the signal via 31a having a smaller capacitance, as compared with the signal via 31b having a larger capacitance. In this way, with an increase in the anti-pad radius of a signal via, the propagation time of a signal flowing through the signal via becomes shorter.

Figure 3:
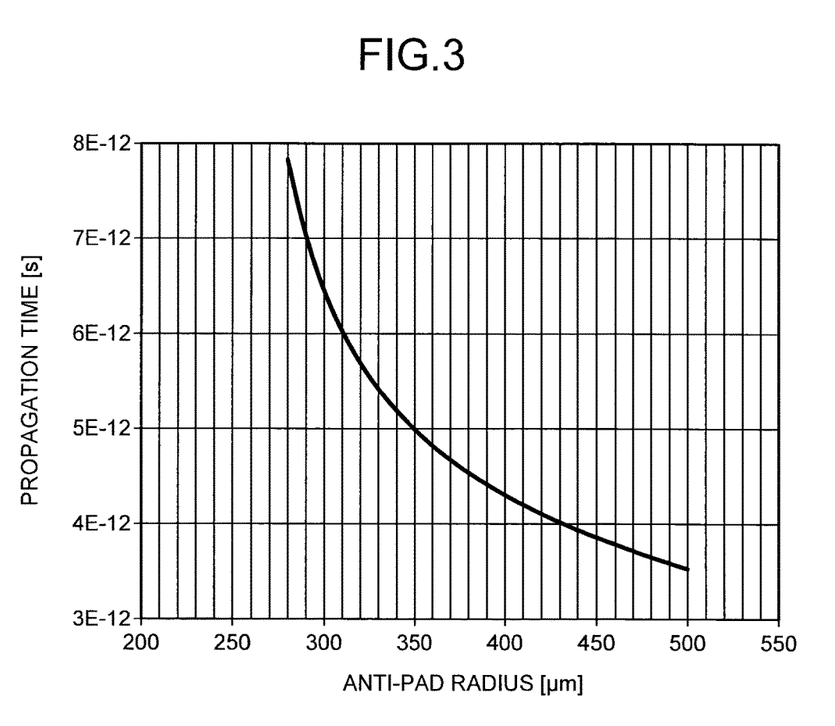
FIG. 3 is a view showing an example of the relationship between a signal propagation delay and an anti-pad radius.

FIG. 3 is a view showing an example of the relationship between the signal propagation delay and the anti-pad radius. In FIG. 3, the horizontal axis denotes the anti-pad radius (μm), and the vertical axis denotes the time (propagation time) (s) necessary for a signal to be propagated through a via having a predetermined length. As shown in FIG. 3, the smaller the anti-pad radius is, the longer the propagation time becomes for a signal propagated through the via; and the larger the anti-pad radius is, the shorter the propagation time becomes. By utilizing this relationship, the data delay in a differential signal wiring having different signal line lengths can be adjusted.

Figure 4:
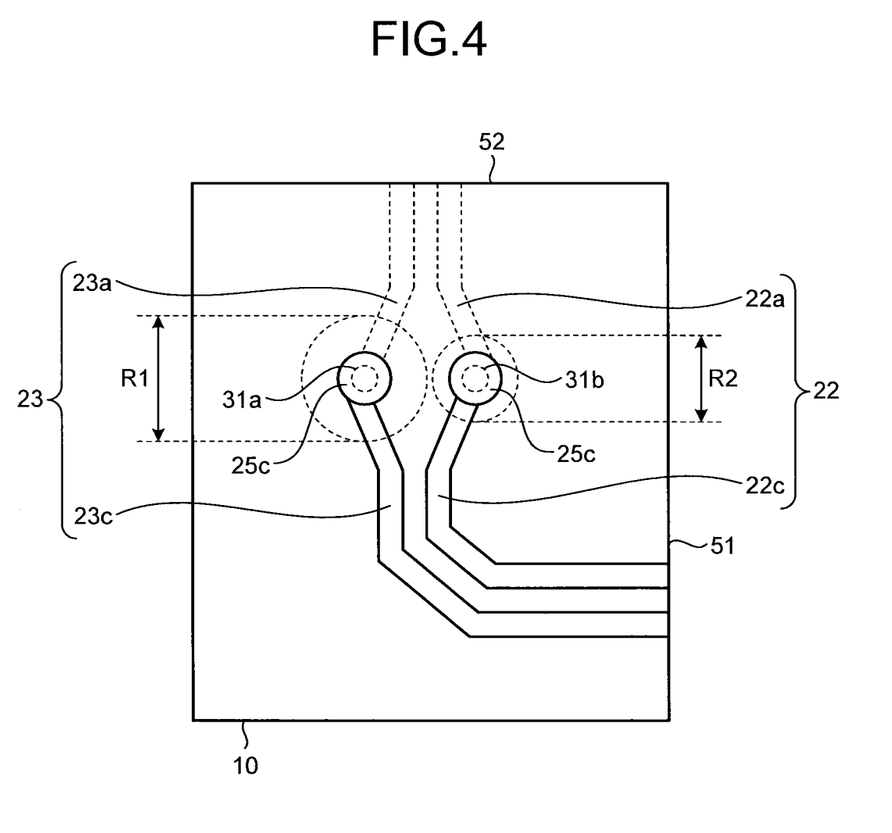
FIG. 4 is a view schematically showing the routes of a differential signal wiring on the multilayer printed boards shown in FIGS. 1B and 1C.

FIG. 4 is a view schematically showing the routes of a differential signal wiring on the multilayer printed boards shown in FIGS. 1B and 1C. In FIG. 4, the wiring portions 22a and 23a of the first wiring layer 20a formed on the lower side of the insulating substrate 10 are shown with broken lines. Further, illustration of the constant potential layer 21 is omitted. As shown in FIG. 4, the anti-pad radius R1 of the signal line 23 having a longer route is set larger than the anti-pad radius R2 of the signal line 22 having a shorter route. In such a differential signal wiring, from the transmission end 51 to the signal vias 31a and 31b, the signal propagated through the wiring portion 22c arrives earlier than the signal propagated through the wiring portion 23c having a longer wiring line distance. However, at the signal via 31a having a smaller capacitance that can cause accumulation, the signal propagation time is shorter. In other words, the signal delay between the two signal lines 22 and 23 can be adjusted by use of the signal vias 31a and 31b. Consequently, the signals propagated through the signal lines 22 and 23 arrive at the reception end 52 almost the same time.

According to the first embodiment, in a case where a wiring portion in a differential signal wiring of a certain layer are connected to a wiring portion in the differential signal wiring of another layer by use of signal vias, the signal line having a larger physical wiring line length is provided with a larger anti-pad radius. With an increase in the anti-pad radius, the capacitance between the signal via and the constant potential layers becomes smaller, and so the signal propagation time made by the signal via becomes shorter. In this way, the delay between the two signal lines is adjusted by use of the signal vias. Consequently, the signal propagation times made by the two signal lines can be set almost equal to each other. In other words, only by setting the vias of the signal lines to have different anti-pad radii, there is provided an effect of adjusting their electric lengths so that the electric length difference between the signals becomes smaller.

Further, when the signal via diameter and the pad diameter are set the same as each other, the diameters of signal vias and pads do not need to be changed depending on the signal line length. Consequently, there is provided an effect of easily adjusting the electric length difference, without entailing an increase in the number of operation steps due to a special shape or an increase in wiring line regions.

(Second Embodiment)

In the first embodiment, an explanation was given of a differential signal wiring. In the second embodiment, an explanation will be given of a bus wiring for performing parallel communication.

Figure 5A:
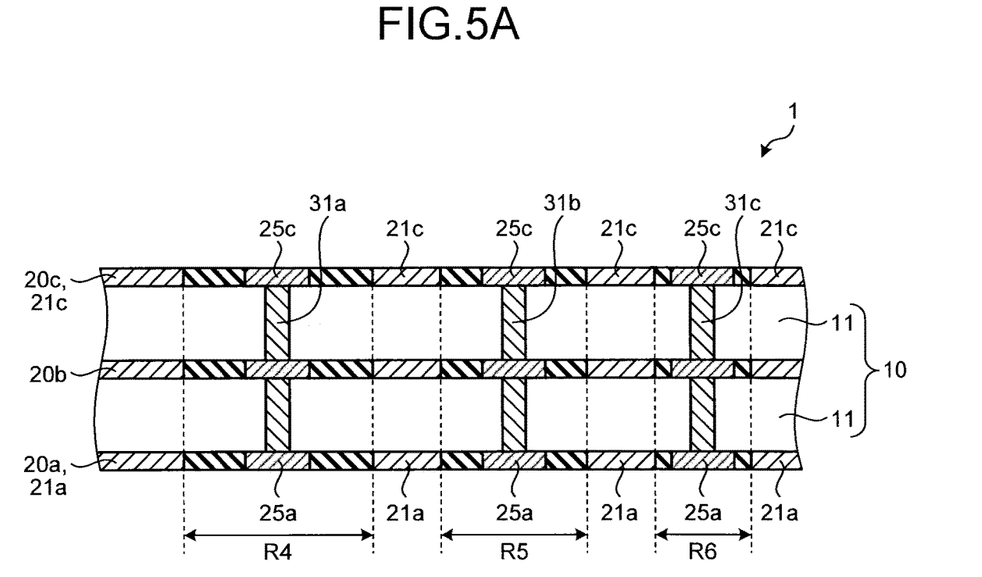
FIGS. 5A to 5D are views schematically showing part of the structure of a multilayer printed board according to a second embodiment.
Figure 5B:
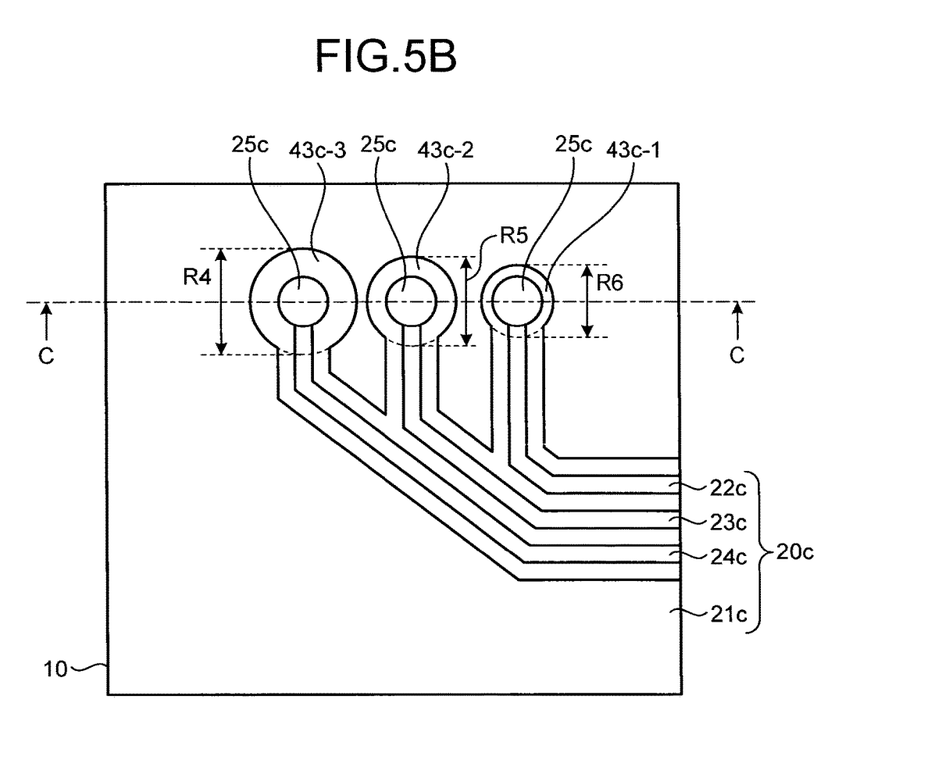
Figure 5C:
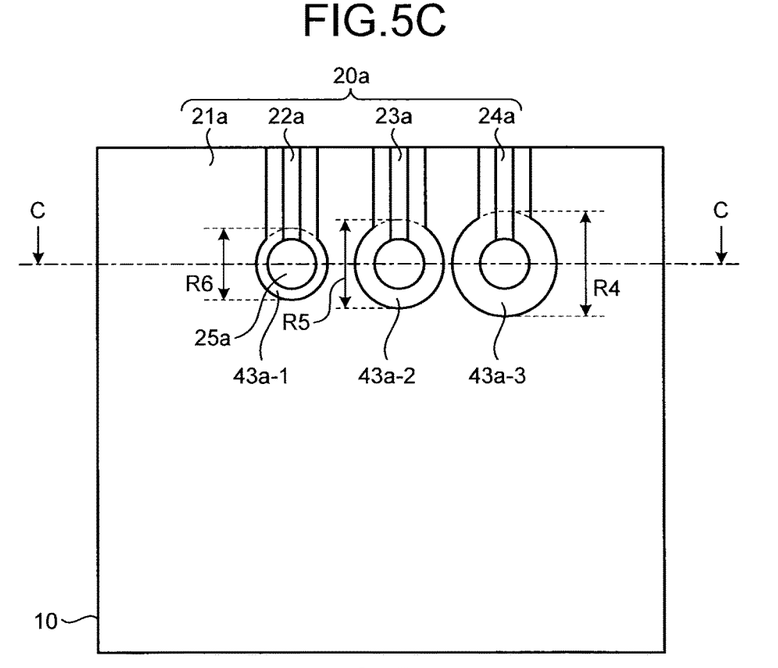
Figure 5D:
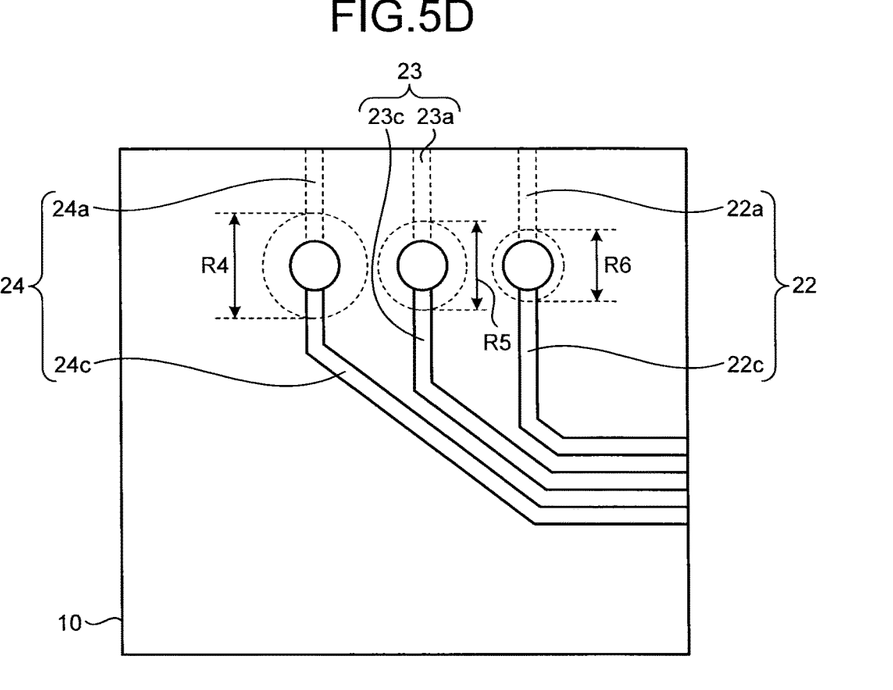

FIGS. 5A to 5D are views schematically showing part of the structure of a multilayer printed board according to the second embodiment. Here, FIG. 5A is a sectional view taken along a line C-C of the multilayer printed board shown in FIGS. 5B and 5C, FIG. 5B is a top view of the multilayer printed board shown in FIG. 5A, FIG. 5C is a bottom view of the multilayer printed board shown in FIG. 5A, and FIG. 5D is a view schematically showing the routes of a bus wiring on the multilayer printed board shown in FIGS. 5B and 5C. Further, in FIG. 5D, wiring portions 22a to 24a of a first wiring layer 20a formed on the lower side of an insulating substrate 10 are shown with broken lines, and illustration of a constant potential layer 21 is omitted.

This multilayer printed board 1 has a basic structure the same as that of the first embodiment. However, the second embodiment differs in that a bus wiring is arranged in place of a differential signal wiring. This example shows a case where the bus wiring is composed of three signal lines 22 to 24. The signal line 22 is composed of a wiring portion 22c, a pad 25c, a signal via 31c, a pad 25a, and a wiring portion 22a. The signal line 23 is composed of a wiring portion 23c, a pad 25c, a signal via 31b, a pad 25a, and a wiring portion 23a. The signal line 24 is composed of a wiring portion 24c, a pad 25c, a signal via 31a, a pad 25a, and a wiring portion 24a. It should be noted that the bus wiring is generally composed of a set of signal lines in a unit of a natural number times of 8, but FIGS. 5A to 5D show only three signal lines as the bus wiring for the sake of simplicity of explanation. In the following explanation, the constituent elements corresponding to those of the first embodiment are denoted by the same reference numerals, and their description will be omitted. Further, in the example shown in FIGS. 5A to 5D, the openings of respective signal vias 31a to 31c are not connected to openings adjacently formed. Accordingly, the openings are almost equal to anti-pad regions 43a-1 to 43a-3 and 43c-1 to 43c-3.

Also in the second embodiment, a signal line having a longer signal route is provided with a larger anti-pad radius. In this example, the signal route lengths are in a state of "the signal line 22<the signal line 23<the signal line 24". Thus, where R6, R5, and R4 respectively denote the anti-pad radii of the signal lines 22 to 24, they are set to satisfy "R6<R5<R4". In this case, where C6, C5, and C4 respectively denote the capacitances between the signal vias 31c, 31b, and 31a and the constant potential layers 21a to 21c, they come to satisfy "C6>C5>C4". Consequently, where t6, t5, t4 respectively denote the signal propagation times made by the signal vias 31c, 31b, and 31a, they come to satisfy "t6>t5>t4". In other words, the signal via 31a included in the signal line 24 having the largest wiring line length renders the shortest signal propagation time, and the signal via 31c included in the signal line 22 having the smallest wiring line length renders the longest signal propagation time.

Here, for example, the size of the anti-pad radius can be obtained, as follows. At first, on the premise that all the signal lines 22 to 24 are provided with the same anti-pad radius, a simulation is performed to obtain the signal delay times caused by the signal lines 23 and 24 relative to the signal propagation time made by the signal line 22. Then, for example, based on the relationship shown in FIG. 3, a calculation is performed to obtain anti-pad radii respectively corresponding to the delay times caused by the signal lines 23 and 24. Then, the anti-pad radii thus calculated are used to change the anti-pad radii of the signal lines 23 and 24 that have caused delays.

With this configuration, also in the bus wiring for performing parallel communication, the signal delay between the signal lines 22 to 24 can be set to fall within a predetermined range.

Figure 6:
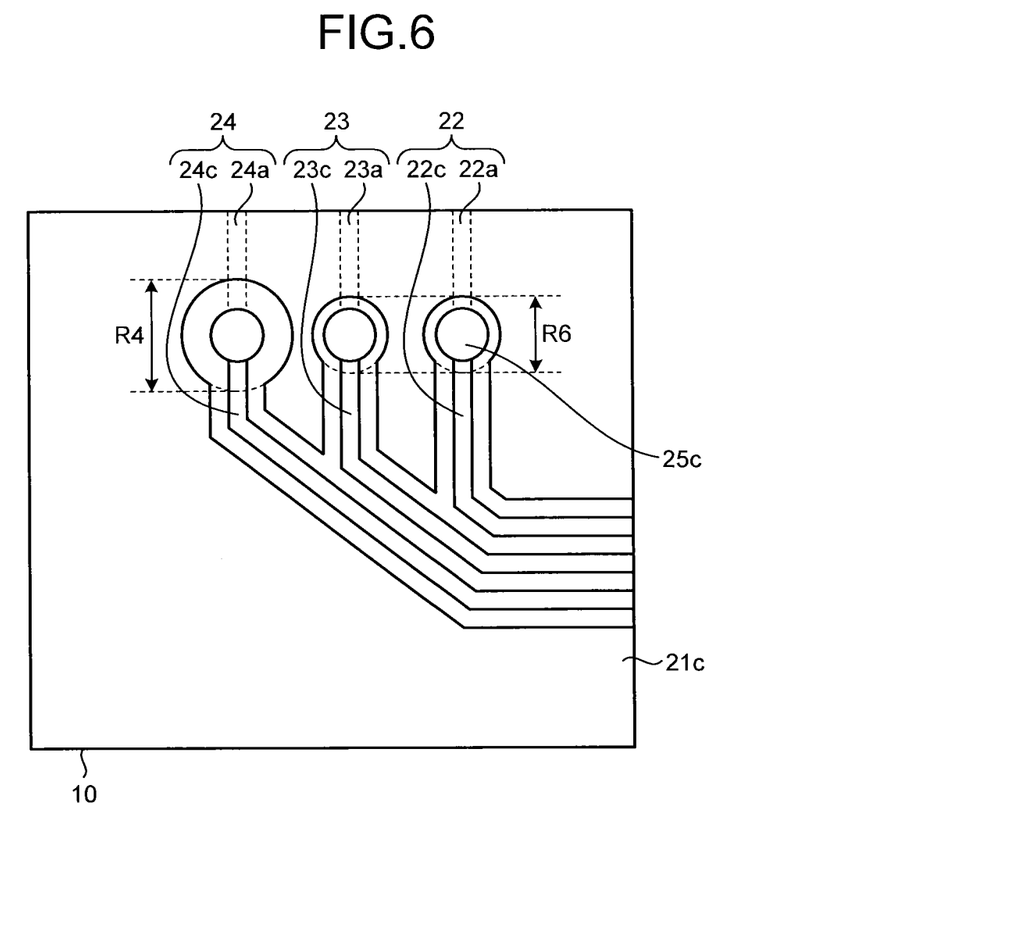
FIG. 6 is a view schematically showing an example of the routes of a bus wiring according to the second embodiment.

It should be noted that FIGS. 5A to 5D show a case where the signal lines 22 to 24 respectively have different anti-pad radii R6 to R4, but this is not limiting. FIG. 6 is a view schematically showing an example of the routes of a bus wiring according to the second embodiment. Also in FIG. 6, the wiring portions 22a to 24a formed on the lower side of the insulating substrate 10 are shown with broken lines. As in the case shown in FIGS. 5A to 5D, the signal route lengths are in a state of "the signal line 22<the signal line 23<the signal line 24". As shown in FIG. 6, the signal lines 22 and 23 are provided with the same anti-pad radius R6, and the signal line 24 is provided with a larger anti-pad radius R4. This configuration is suitable for a case where the signal delay between the signal line 22 and the signal line 23 falls within a predetermined range but the signal delay between the signal line 22 and the signal line 24 does not fall within a predetermined range.

The second embodiment can also provide effects the same as those in the first embodiment.

(Third Embodiment)

In the first and second embodiments, the vias, the pads, and the anti-pad regions respectively have complete round shapes in the direction parallel with the substrate surface. In the third embodiment, an explanation will be given of a case where vias, pads, and anti-pad regions do not have complete round shapes in the direction parallel with the substrate surface.

Figure 7A:
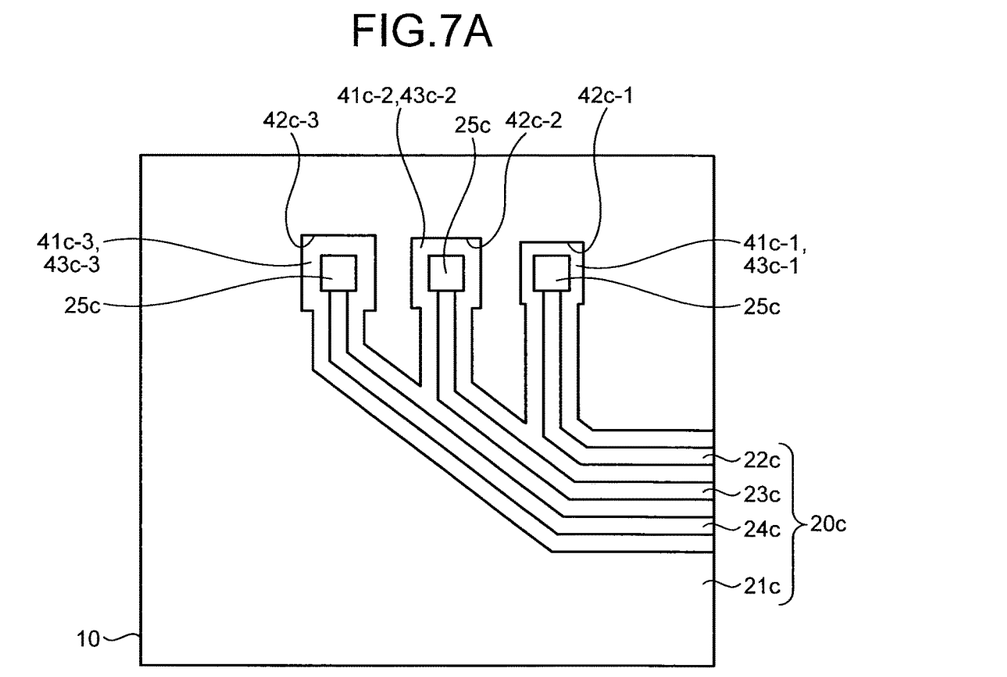
FIGS. 7A and 7B are top views schematically showing examples of the structure of a multilayer printed board according to a third embodiment.
Figure 7B:
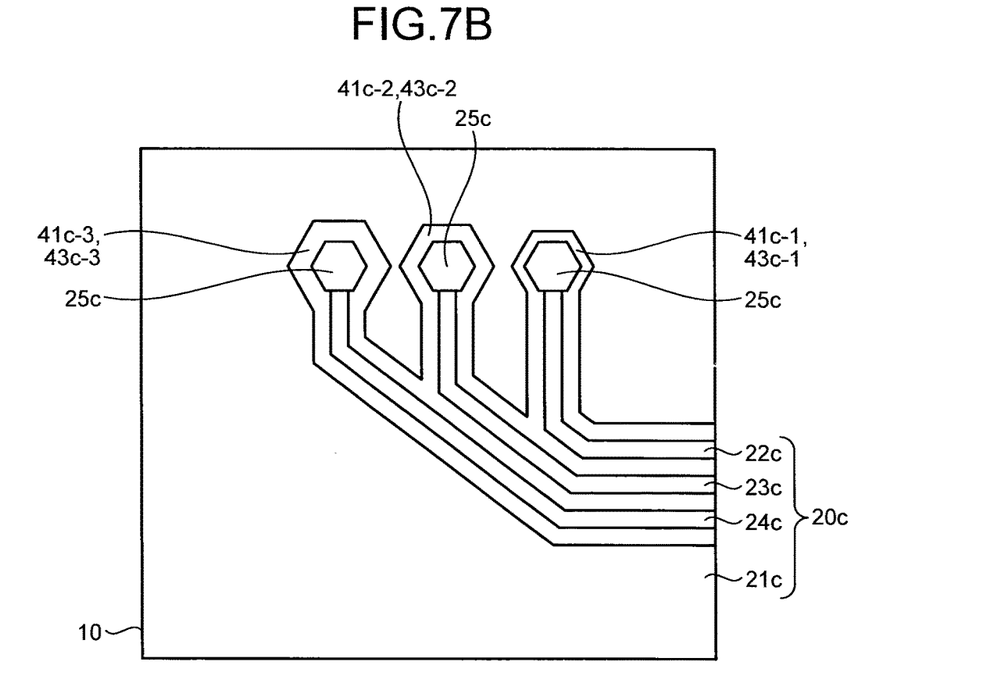

FIGS. 7A and 7B are top views schematically showing examples of the structure of a multilayer printed board according to the third embodiment. Here, FIG. 7A shows a case where the pads and the anti-pad regions have square shapes, and FIG. 7B shows a case where the pads and the anti-pad regions have hexagonal shapes. As shown in FIGS. 7A and 7B, this embodiment differs from the first and second embodiment, such that each of the pads 25c has a polygonal shape, and each of the anti-pad regions 43c-1 to 43c-3 has a polygonal ring shape in accordance with the corresponding one of the pads 25c. In this example, each of the anti-pad regions 43c-1 to 43c-3 has a size almost equal to the corresponding one of the openings 41c-1 to 41c-3. In these cases, the sizes of the anti-pad regions 43c-1 to 43c-3 are determined so that a line having a longer wiring line route is set to have a smaller capacitance between its via including pads and the constant potential layers.

Basically, by increasing the distance between the peripheral portion of each of the pads 25c and the corresponding one of the opening edges 42c-1 to 42c-3 (the peripheral portion of the corresponding one of the anti-pad regions 43c-1 to 43c-3), the capacitance between the signal via and the constant potential layers can be reduced. However, in the case where the shapes of the pads 25c and the shapes of the openings 41c-1 to 41c-3 are polygonal, the distance between the peripheral portion of each of the pads 25c and the corresponding one of the opening edges 42c-1 to 42c-3 varies depending on the place. In such a case where the distance between them varies depending on the place, the degree of the capacitance between the signal via and the constant potential layers can be estimated with reference to the shortest distance between the peripheral portion of each of the pads 25c and the corresponding one of the opening edges 42c-1 to 42c-3.

Figure 8:
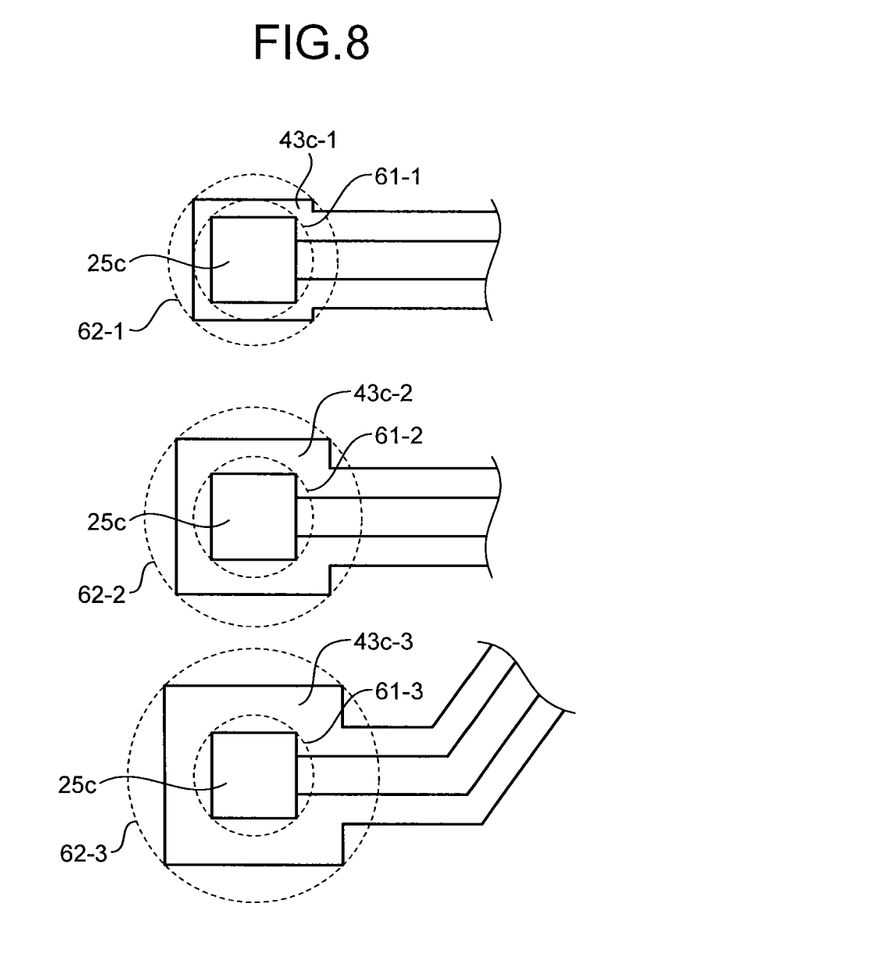
FIG. 8 is a view showing an example of a method of estimating the capacitance between a signal via and constant potential layers.

Further, as another method of estimating the capacitance between the signal via and the constant potential layers, there is a method of using the circumscribed circle of each of the pads 25c and the circumscribed circle of the corresponding one of the openings 41c-1 to 41c-3. FIG. 8 is a view showing an example of a method of estimating the capacitances between each of the signal vias and the constant potential layers. FIG. 8 is an enlarged view showing the pads 25c along with part around the pads 25c. As shown in FIG. 8, imaginary circumscribed circles 61-1 to 61-3 are respectively drawn to correspond to the pads 25c, and imaginary circumscribed circles 62-1 to 62-3 are respectively drawn to correspond to the openings 41c-1 to 41c-3. Then, the difference in radius between the circumscribed circles 61-1 to 61-3 of the pads 25c and the circumscribed circles 62-1 to 62-3 of the openings 41c-1 to 41c-3 is considered as the distance between the peripheral portion of each of the pads 25c and the corresponding one of the opening edges. In this way, the degree of the capacitance between the signal via and the constant potential layers can be estimated also by use of the circumscribed circles.

Further, in each of the examples described above, an explanation was given of a case where all of the pads 25c and the anti-pad regions 43c-1 to 43c-3 have polygonal shapes. However, a combination of a pad and an anti-pad region may be further modified such that one of them has a complete round shape and the other has a polygonal shape, or such that one of them has a polygonal shape and the other has another polygonal shape or does not have a complete round shape or polygonal shape. Also in these cases, it suffices to adjust the distance between the peripheral portion of each of the pads 25c and the peripheral portion of the corresponding one of the anti-pad regions 43c-1 to 43c-3 in accordance with the wiring line route lengths. Further, in these cases, the distance between the peripheral portion of each of the pads 25c and the peripheral portion of the corresponding one of the anti-pad regions 43c-1 to 43c-3 may be estimated by use of the shortest distance, or may be estimated by use of the circumscribed circle in the case of a polygonal shape. Further, in each of the examples described above, an explanation was given of a case applied to a bus wiring, but the shapes of the pads 25c and the anti-pad regions 43c-1 to 43c-3 may be similarly varied also in a case applied to a differential signal wiring.

The third embodiment can also provide effects the same as those in the first embodiment.

(Fourth Embodiment)

In the first to third embodiments, an explanation was given of the structure of a multilayer printed board. In the fourth embodiment, an explanation will be given of a method of performing layout of signal lines on a multilayer printed board.

Figure 9:
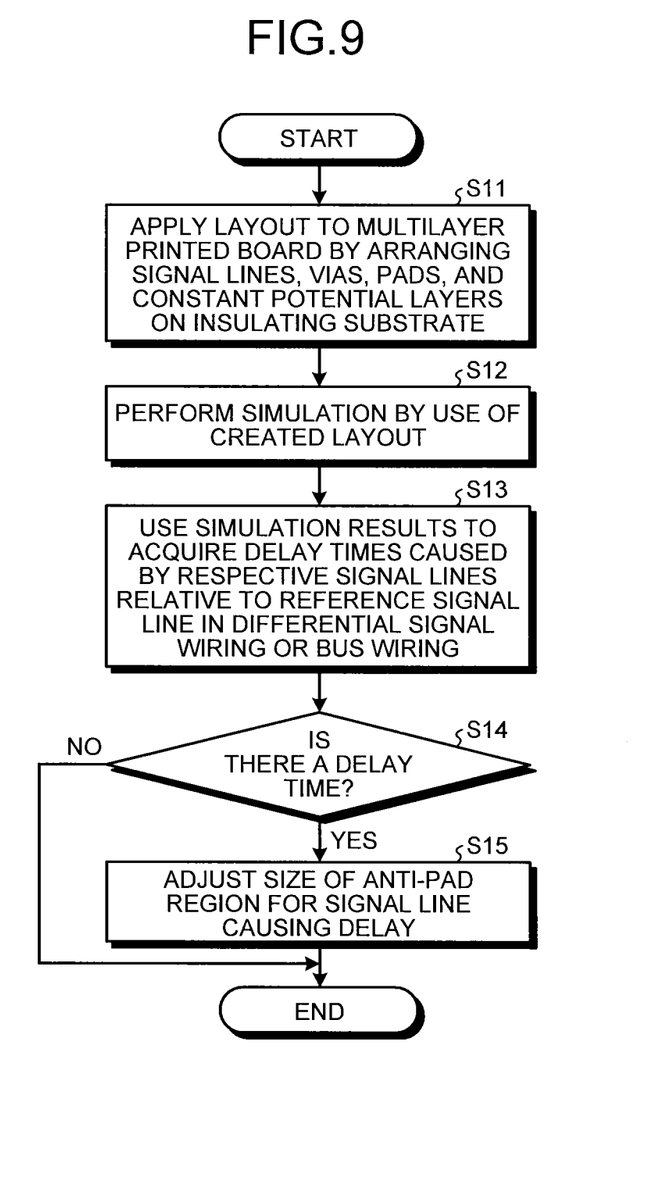
FIG. 9 is a flow chart showing an example of the sequence of a layout method for a multilayer printed board according to a fourth embodiment.

FIG. 9 is a flow chart showing an example of the sequence of a layout method for a multilayer printed board according to the fourth embodiment. At first, the method applies a layout to a multilayer printed board 1 by arranging signal lines (which include wiring portions, vias and pads), and constant potential layers on an insulating substrate 10 (step S11); which can be performed by an operator, using a tool, such as a CAD (Computer Aided Design). The signal lines include a differential signal wiring or bus wiring, as described above in the embodiments.

Then, the method performs a simulation by use of the created layout (step S12). This simulation is used to verify whether the multilayer printed board 1 with the created layout entails electric problems. For example, the simulation is performed by use of a three-dimensional electromagnetic analysis tool. Specifically, the multilayer printed board 1, which is the analysis target, is divided in a mesh-like state. Then, a magnetic field and an electric field are set at each of the apexes of the mesh, and a Scattering parameter is calculated by solving a Maxwell equation. Then, a propagation time is calculated by a simulation using the Scattering parameter in accordance with a TDR (Time Domain Reflectometry) method.

Thereafter, the method uses the simulation results to acquire delay times caused by the respective signal lines relative to the reference signal line in the differential signal wiring or bus wiring (step S13). Then, the method makes a judgment as to whether there is a delay time in the differential signal wiring or bus wiring (step S14). For example, this judgment can be made by determining whether or not a signal arrives at the reception end within a predetermined time, with reference to the earliest signal arriving at the reception end.

If there is a delay time in the differential signal wiring or bus wiring (Yes in the step S14), the method changes the size of the anti-pad region for the signal line causing the delay (step S15); which can be performed by an operator. As described previously, when the both of the pad and anti-pad region of a combination have complete round shapes, the size of the anti-pad region is the anti-pad radius. As regards the change of the anti-pad radius, if the reference is a signal line showing the earliest signal arrival, it suffices to increase the anti-pad radius of another signal line. Further, if the reference is a signal line showing an intermediate signal arrival time among a plurality of signal lines present as delay measurement targets, it suffices to reduce the anti-pad radius of another signal line showing an earlier signal arrival than the reference signal line and to increase the anti-pad radius of another signal line showing a later signal arrival than the reference signal line.

Further, the size of the anti-pad region for canceling an acquired delay time may be obtained from, e.g., the information shown in FIG. 4, to independently change the size of the anti-pad region for each of the signal lines. Alternatively, the sizes of the anti-pad regions for a plurality of signal lines may be changed to be the same so that the delay times caused by these signal lines relative to the reference signal line fall within a predetermined time. With the steps describes above, the method ends the layout process.

Further, as a result of the step S14, if there is no delay time in the differential signal wiring or bus wiring (No in the step S14), the method ends the layout process as it is.

When the layout thus determined is applied to a multilayer printed board 1, there is provided a multilayer printed board 1, as explained in any one of the first to third embodiments.

In the fourth embodiment, the layout of signal lines, vias, pads, and constant potential layers arranged on a multilayer printed board 1 is performed, and a simulation is performed with this layout. As a result of the simulation, if there is an unacceptable delay caused in a signal line, the size of the anti-pad region for the signal line is adjusted so that the delay time between signal lines is made to fall within a permissible range. Consequently, there is provided an effect of designing a multilayer printed board 1 that can transmit signals synchronously through signal lines in a differential signal wiring or bus wiring.

It is possible that the layout method for the multilayer printed board described in the present embodiments are implemented as a computer program to be executed by a computer. The computer program for causing a computer to execute the layout method for the multilayer printed board is provided in such a way that the computer program is recorded as an installable format file or executable format file in a computer-readable recording medium such as a compact disc read only memory (CD-ROM), a Floppy (registered trademark) disk, and a digital versatile disc or a digital video disc (DVD). The computer program for causing a computer to execute the layout method for the multilayer printed board explained in the present embodiments can be stored in a computer connected to the network such as the Internet, and downloaded via the network.

When the layout method for the multilayer printed board are implemented as a computer program to be executed by a computer, the above described tool can be configured by an information processing apparatus such as a personal computer that includes a calculating unit such as a central processing unit (CPU), a storing unit such as a read only memory (ROM) and a random access memory (RAM), an external storing unit such a hard disk drive (HDD) and a CD-ROM drive device, a display unit such a display device, an input unit such as a keyboard and a mouse, and a network interface such as a network board if necessary. In this case, a computer program that causes a computer to execute the layout method for the multilayer printed board installed in the external storing unit is loaded on the storing unit such as a RAM and is executed by the calculating unit, thereby performing the above method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multilayer printed board comprising:
   an insulating substrate made of an insulating material and provided with two or more wiring layers that include a constant potential layer and are disposed thereon in a thickness direction;

a differential signal wiring composed of two signal lines arranged in parallel with each other, each of the two signal lines including wiring portions arranged at the different wiring layers, a signal via, and pads, the wiring portion being arranged in a region where the constant potential layer is not arranged in each of the wiring layers, the signal via being connecting between the wiring portions of the different wiring layers, and the pads being respectively arranged at connection positions between the wiring portions and the signal via, within the wiring layers; and anti-pad regions respectively formed between the constant potential layer and the pads that are located at a same height as the constant potential layer in the thickness direction in each of the wiring layers, wherein distances in a direction perpendicular to the thickness direction between peripheries of the pad and the constant potential layer in each of the wiring layers are set so that a capacitance between the constant potential layers and a signal via included in one of the signal lines constituting the differential signal wiring, which has a longer route from a transmission end to a reception end, is smaller than a capacitance between the constant potential layers and another signal via included in the other one of the signal lines.

2. The multilayer printed board according to claim 1, wherein the pads have circular shapes,
the anti-pad regions have annular shapes respectively around the pads, and
radii respectively connecting peripheries of the anti-pad regions to centers of the pads are set such that one of the radii for the signal line having a longer route is larger than another one of the radii for the other signal line.

3. The multilayer printed board according to claim 1, wherein the pads have polygonal shapes,
the anti-pad regions have polygonal ring shapes respectively around the pads, and
shortest distances respectively connecting peripheries of the anti-pad regions to peripheries of the pads are set such that one of the shortest distances for the signal line having a longer route is larger than another one of the shortest distances for the other signal line.

4. The multilayer printed board according to claim 1, wherein the pads have polygonal shapes,
the anti-pad regions have polygonal ring shapes respectively around the pads, and
distances respectively defined between circumscribed circles of the anti-pad regions and circumscribed circles of the pads are set such that one of the distances for the signal line having a longer route is larger than another one of the distances for the other signal line.

5. The multilayer printed board according to claim 1, wherein the constant potential layer is a power supply layer or a GND layer.

6. The multilayer printed board according to claim 1, wherein the insulating material constituting the insulating substrate is a glass epoxy resin, fluorine contained resin, or polyimide resin, and
the anti-pad regions are filled with a glass epoxy resin, fluorine contained resin, or polyimide resin.

7. The multilayer printed board according to claim 1, wherein the pads for the two signal lines have sizes equal to each other.

8. A multilayer printed board comprising:
an insulating substrate made of an insulating material and provided with two or more wiring layers that include a constant potential layer and are disposed thereon in a thickness direction;
a bus wiring composed of a plurality of signal lines arranged in parallel with each other, each of the plurality of signal lines including wiring portions arranged at the different wiring layers, a signal via, and pads, the wiring portion being arranged in a region where the constant potential layer is not arranged in each of the wiring layers, the signal via being connecting between the wiring portions of the different wiring layers, and the pads being respectively arranged at connection positions between the wiring portions and the signal via, within the wiring layers; and
anti-pad regions respectively formed between the constant potential layer and the pads that are located at a same height as the constant potential layer in the thickness direction in each of the wiring layers,
wherein distances in a direction perpendicular to the thickness direction between peripheries of the pad and the constant potential layer in each of the wiring layers are set so that a capacitance between the constant potential layers and a signal via included in one of the signal lines constituting the bus wiring, which has a longer route from a transmission end to a reception end, is smaller than a capacitance between the constant potential layers and another signal via included in one of the signal lines, which has a shorter route.

9. The multilayer printed board according to claim 8, wherein the pads have circular shapes,
the anti-pad regions have annular shapes respectively around the pads, and
radii respectively connecting peripheries of the anti-pad regions to centers of the pads are set such that one of the radii for the signal line having a longer route is larger than another one of the radii for the signal line having a shorter route.

10. The multilayer printed board according to claim 9, wherein the radii respectively connecting peripheries of the anti-pad regions to centers of the pads are different from each other between all of the plurality of signal lines.

11. The multilayer printed board according to claim 9, wherein the radii respectively connecting peripheries of the anti-pad regions to centers of the pads are equal to each other between some of the plurality of signal lines.

12. The multilayer printed board according to claim 8, wherein the pads have polygonal shapes,
the anti-pad regions have polygonal ring shapes respectively around the pads, and
shortest distances respectively connecting peripheries of the anti-pad regions to peripheries of the pads are set such that one of the shortest distances for the signal line having a longer route is larger than another one of the shortest distances for the signal line having a shorter route.

13. The multilayer printed board according to claim 8, wherein the pads have polygonal shapes,
the anti-pad regions have polygonal ring shapes respectively around the pads, and
distances respectively defined between circumscribed circles of the anti-pad regions and circumscribed circles of the pads are set such that one of the distances for the signal line having a longer route is larger than another one of the distances for the signal line having a shorter route.

14. The multilayer printed board according to claim 8, wherein the constant potential layer is a power supply layer or a GND layer.

15. The multilayer printed board according to claim 8, wherein the insulating material forming the insulating substrate is a glass epoxy resin, fluorine contained resin, or polyimide resin, and
   the anti-pad regions are filled with a glass epoxy resin, fluorine contained resin, or polyimide resin.

16. The multilayer printed board according to claim 8, wherein the pads for the plurality of signal lines have sizes equal to each other.

\* \* \* \* \*